United States Patent Office 2,863,526
Patented Dec. 9, 1958

2,863,526

METHOD OF SEPARATING HYDROGEN ISOTOPES

Oliver N. Salmon, Schenectady, N. Y., assignor to the United States of America as represented by the United States Atomic Energy Commission No Drawing. Application October 17, 1956
Serial No. 616,581

1 Claim. (Cl. 183—114.2)

This invention deals with a method of separating isotopes of hydrogen, and in particular with a method based on sorption.

It is an object of this invention to provide a method by which a mixture of hydrogen isotopes may be separated in a simple and efficient manner.

It has been found that, when finely divided palladium is contacted with a mixture of the hydrogen isotopes, the hydrogen is preferentially taken up by the palladium while the deuterium and tritium are sorbed to a lesser degree, the sorption of the tritium being least. Likewise, the rate of sorption of hydrogen, deuterium and tritium decreases in the order mentioned. The method of this invention utilizes these facts, and fractionation of hydrogen isotope mixtures is carried out by passing these mixtures over palladium; the result is a hydrogen-enriched gas fraction held by the palladium and a remaining gas fraction enriched in deuterium and/or tritium.

The process can be carried out in an especially efficient manner by using a number of palladium beds connected in series, thereby dividing the gas mixture in a corresponding number of fractions. For instance, in the case of a mixture of the three isotopes and the use of two palladium beds, the first palladium bed contains a hydrogen-enriched fraction, the second bed a deuterium-enriched fraction, and the escaping gas represents a tritium-enriched fraction. The various fractions may then be desorbed from the palladium and subjected to another fractionating cycle whereby further enrichment and separation are achieved. By using some of the beds for the sorption process while others are regenerated, for instance by heating, a semi-continuous operation is possible.

Palladium is preferably used in very finely divided form, for instance as palladium black or palladium sponge. It is advantageous to dilute the palladium by dispersing it in silica sand or other inert materials. The temperature of operation may vary widely; room temperature, approximately 25° C., has been found satisfactory. The gas mixture may either be brought to superatmospheric pressure prior to passing it over the palladium, or it may be pumped through the palladium by mechanical means. Another way of effecting gas flow is by arranging a bed of uranium at the end of the line of the palladium beds; the uranium acts as a "chemical pump" by pulling the gas through the palladium.

Instead of separating the various isotopes by fractional sorption, it is also feasible first completely to take up the entire mixture with palladium and then fractionally to evolve the gas mixture by gradually elevating the temperature and collecting the evolved gas in separate fractions. The tritium is evolved faster than the deuterium, and the deuterium faster than the hydrogen; thus tritium-enriched fractions are obtained first in this case and hydrogen-enriched fractions last.

In the following an example is given to illustrate the process of the invention on a hydrogen-deuterium mixture.

EXAMPLE I

A hydrogen-deuterium mixture, the quantity as well as the composition of which had been determined, was passed through two interconnected palladium beds in succession, each of which had a diameter of 1 inch and a height of 6 inches; each bed contained 35 grams of palladium black dispersed in 175 grams of silica sand of 50 to 150 mesh. A uranium bed containing 33 grams of uranium was connected with the second palladium bed as a chemical pump. During sorption all three beds were at room temperature. After the entire gas quantity had been passed through the three beds, they were disconnected from each other, and each was heated separately to evolve the sorbed gas. A sample of the fraction from each bed was analyzed. Five runs were carried out with mixtures of different hydrogen-deuterium ratios. The results of these experiments are given in the table below.

*Summary of hydrogen isotope separation runs*

| Run No. | Original Composition, Percent | | Pd Bed No. 1, Percent | | Pd Bed No. 2, Percent | | U Bed, Percent | | Sorption Time, minutes |
|---|---|---|---|---|---|---|---|---|---|
| | $H_2$ | $D_2$ | $H_2$ | $D_2$ | $H_2$ | $D_2$ | $H_2$ | $D_2$ | |
| 1 | 94.85 / 260 cc. (STP) | 5.15 | 96.5 / 58.5% of gas | 3.5 | 94.3 / 20.5% of gas | 4.7 | 87.3 / 15.8% of gas | 12.7 | 5 |
| 2 | 89.85 / 259 cc. (STP) | 10.15 | 94.7 / 48.8% of gas | 5.3 | 91.7 / 23.8% of gas | 8.25 | 78.3 / 23% of gas | 21.7 | 5 |
| 3 | 48.6 / 259 cc. (STP) | 51.4 | 67.1 / 30% of gas | 32.9 | 59.8 / 22% of gas | 40.2 | 29.7 / 39% of gas | 70.3 | 5 |
| 4 | 10.2 / 259 cc. (STP) | 89.8 | 25.1 / 12.8% of gas | 74.9 | 20.4 / 12.3% of gas | 79.6 | 6.4 / 64.2% of gas | 93.6 | 7 |
| 5 | 6.6 / 261 cc. (STP) | 93.4 | 14.2 / 15.8% of gas | 85.8 | 14.5 / 22% of gas | 85.6 | 3.9 / 55% of gas | 96.1 | 7 |

It will be obvious from this table that in all instances the first palladium bed contained a gas which was enriched in hydrogen as compared with the original composition and that, on the other hand, the uranium bed contained a deuterium-enriched gas mixture. A repetition of these runs with the various fractions would, of course, result in further enrichment and separation.

The next example illustrates the process of this invention as applied to a hydrogen-tritium mixture.

EXAMPLE II

This experiment was carried out using one palladium bed only, which had the same dimensions and contained the same quantity and kind of palladium-silica mixture as those used in Example I and 37 cc. (STP) of a hydrogen-tritium mixture containing 2.5% by volume of tritium. The entire gas mixture was adsorbed on the palladium at room temperature and 103 mm. Hg. Thereafter the palladium was heated slowly to about 115° C, and the bed was connected with a Toepler pump whereby the gas was sucked off.

The released gas was collected in two fractions, a first fraction of 15.2 cc. and a second fraction of 20.7 cc. Each fraction was analyzed by mass spectroscopy for its tritium content. The first fraction was found to contain 4.01% by volume of tritium and the second fraction 1.49% by volume of tritium.

A mixture containing tritium and deuterium, or a mixture containing all three of the hydrogen isotopes, is fractionated similarly to the hydrogen-deuterium mixture by the process of this invention. This process is very well suitable for the recovery of tritium from isotope mixtures such as they are obtained, for instance, from neutron-irradiated lithium.

This application is a continuation-in-part of application Serial No. 318,740, filed on November 4, 1952, now abandoned.

It will be understood that this invention is not to be limited to the details given herein but that it may be modified within the scope of the appended claim.

What is claimed is:

A process of separating a gaseous mixture of hydrogen and tritium, comprising contacting finely divided palladium with said mixture whereby the gaseous mixture is taken up by sorption, gradually heating the palladium whereby a fraction rich in tritium is first given off and collecting the evolved fractions as they are formed.

References Cited in the file of this patent

Frazini: Nature, vol. 135 (1935), page 308.

Mellor: "Comprehensive Treatise of Inorganic and Theoretical Chemistry," vol. 15, pages 616–624, Longmans, Green & Co., London (1936).